United States Patent
Petersen

(10) Patent No.: US 9,122,313 B2
(45) Date of Patent: *Sep. 1, 2015

(54) VIEWPOINT CHANGE ON A DISPLAY DEVICE BASED ON MOVEMENT OF THE DEVICE

(71) Applicant: Barry Lee Petersen, Castle Rock, CO (US)

(72) Inventor: Barry Lee Petersen, Castle Rock, CO (US)

(73) Assignee: CELSIA, LLC, San Jose, CA (US)

( * ) Notice: Subject to any disclaimer, the term of this patent is extended or adjusted under 35 U.S.C. 154(b) by 33 days.

This patent is subject to a terminal disclaimer.

(21) Appl. No.: 14/243,961

(22) Filed: Apr. 3, 2014

(65) Prior Publication Data

US 2014/0253436 A1    Sep. 11, 2014

Related U.S. Application Data

(62) Division of application No. 12/819,250, filed on Jun. 21, 2010, now Pat. No. 8,730,267.

(51) Int. Cl.
| | | |
|---|---|---|
| G09G 5/00 | (2006.01) | |
| G06F 3/01 | (2006.01) | |
| G06Q 30/00 | (2012.01) | |
| G06T 15/20 | (2011.01) | |

(52) U.S. Cl.
CPC ............. *G06F 3/017* (2013.01); *G06Q 30/00* (2013.01); *G06T 15/20* (2013.01); *G06T 2210/16* (2013.01)

(58) Field of Classification Search
CPC combination set(s) only.
See application file for complete search history.

(56) References Cited

U.S. PATENT DOCUMENTS

| | | | |
|---|---|---|---|
| 4,669,812 | A | 6/1987 | Hoebing |
| 5,808,613 | A | 9/1998 | Marrin et al. |
| 5,818,420 | A | 10/1998 | Mitsumine et al. |
| 6,009,188 | A | 12/1999 | Cohen et al. |
| 6,049,622 | A | 4/2000 | Robb et al. |
| 6,097,389 | A | 8/2000 | Morris et al. |
| 6,222,937 | B1 | 4/2001 | Cohen et al. |
| 6,262,734 | B1 | 7/2001 | Ishikawa |
| 6,556,201 | B1 | 4/2003 | Maehara et al. |
| 6,628,279 | B1 | 9/2003 | Schell et al. |
| 7,034,821 | B2 | 4/2006 | Baumberg |
| 7,262,783 | B2 | 8/2007 | Kramer et al. |
| 7,502,036 | B2 | 3/2009 | Kramer et al. |
| 7,542,050 | B2 | 6/2009 | Kramer et al. |
| 7,616,834 | B2 | 11/2009 | Kramer et al. |
| 2002/0085219 | A1 | 7/2002 | Ramamoorthy |
| 2005/0283371 | A1 | 12/2005 | Tiramani |

(Continued)

OTHER PUBLICATIONS

STMicroelectronics, LIS302DL, MEMS motion sensor, 2008, pp. 1-42, Web-Address: http://www.st.com/stonline/products/literature/ds/12726/lis302dl.htm.

(Continued)

*Primary Examiner* — Leon T Cain, II
(74) *Attorney, Agent, or Firm* — Michael J. Feigin, Esq.; Feigin & Associates, LLC

(57) ABSTRACT

Embodiments of the disclosed technology comprise a hand-held display device with built-in accelerometer and, in some embodiments, compass. The display of a human figure is changed based on a change in viewpoint/orientation of the device. That is, upon detecting a change in viewpoint (e.g., viewing angle, tilt, roll, or pitch of the device), the image of the person changes. This may be used with a still picture of a person, such as for the sale of clothing, or in conjunction with moving images, such as for a sports or exercise instructional video.

20 Claims, 11 Drawing Sheets

(56) References Cited

U.S. PATENT DOCUMENTS

2010/0222179 A1    9/2010  Temple et al.
2010/0259610 A1   10/2010  Petersen
2010/0283860 A1*  11/2010  Nader .................... 348/222.1
2010/0302278 A1   12/2010  Shaffer et al.

OTHER PUBLICATIONS

Peekaboo Girls, http://appshopper.com/entertainment/peekaboo-girls, accessed, Sep. 15, 2010.

Mathews G.J. Visualization Blackboard—Visualizing Space Science Data in 3D IEEE Computer Graphics and Applications vol. 16 Iss. 6 Nov. 1996 pp. 6-9.

Teraoka T.; Maruyama M. Adaptive Information Visualization Based on the User's Multiple Viewpoints—Interactive 3D Visualization of the WWW Information Visualization Oct. 21, 1997 pp. 25-28.

360 Promo: "Product Tours"; from website http://web.archive.org/web/20030812042917/http://www.360promo.com/objecttours.html; Aug. 12, 2003.

* cited by examiner

Figure 1
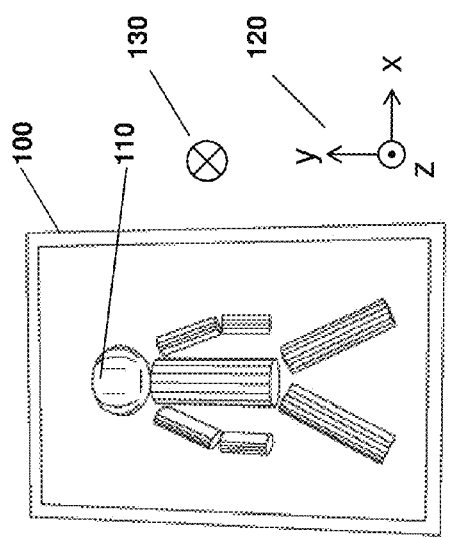
Figure 1A
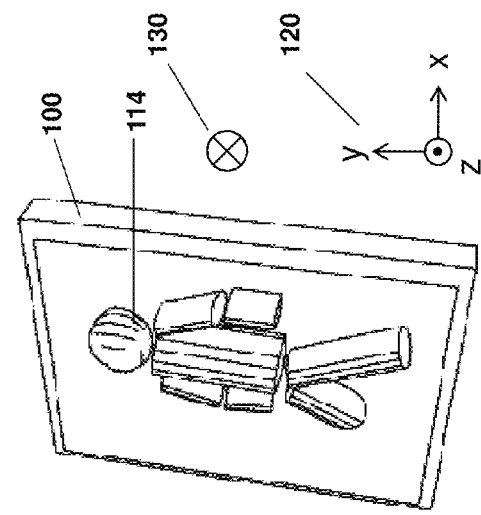
Figure 1B
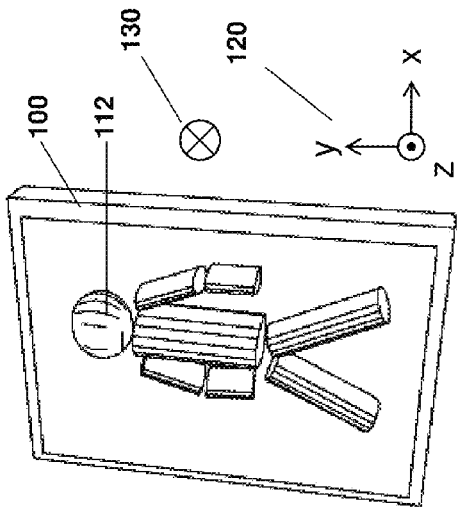
Figure 1C

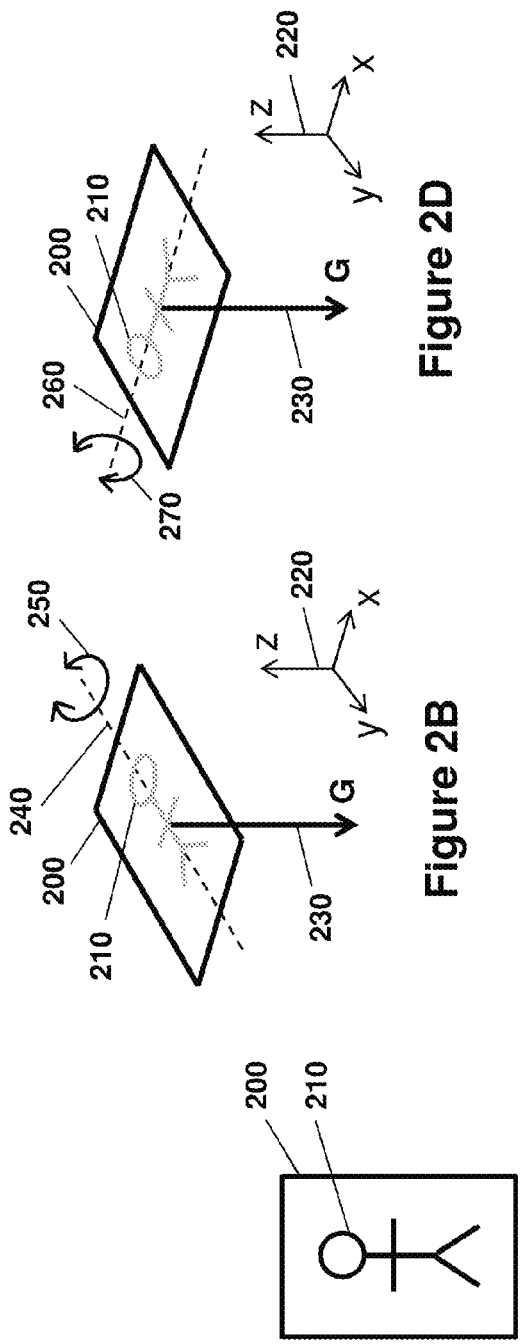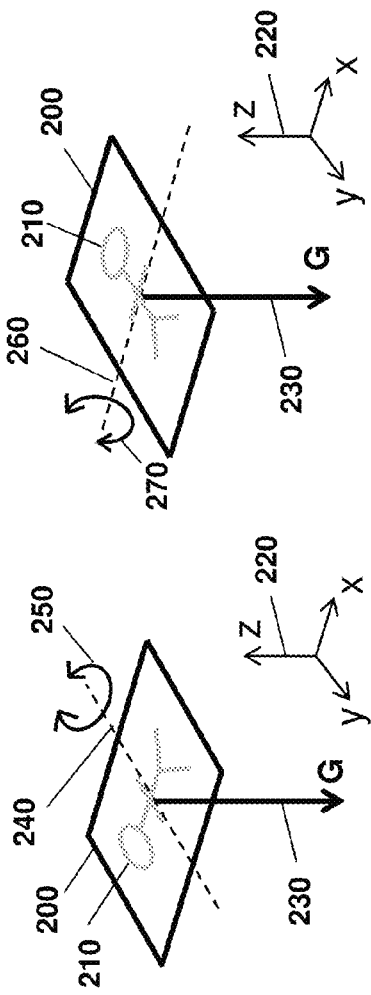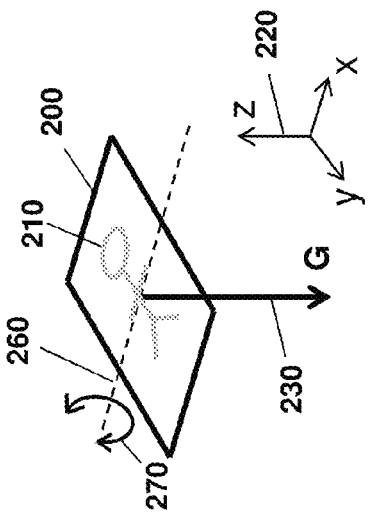

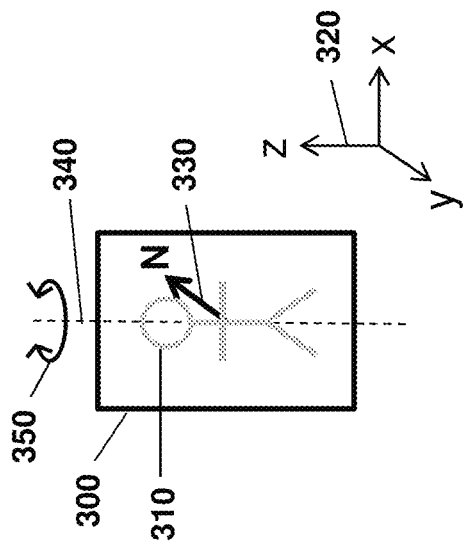
Figure 3B
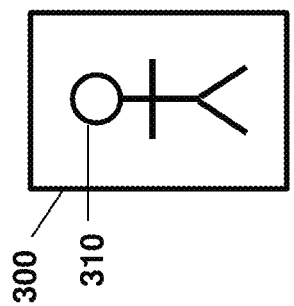
Figure 3A
Figure 3

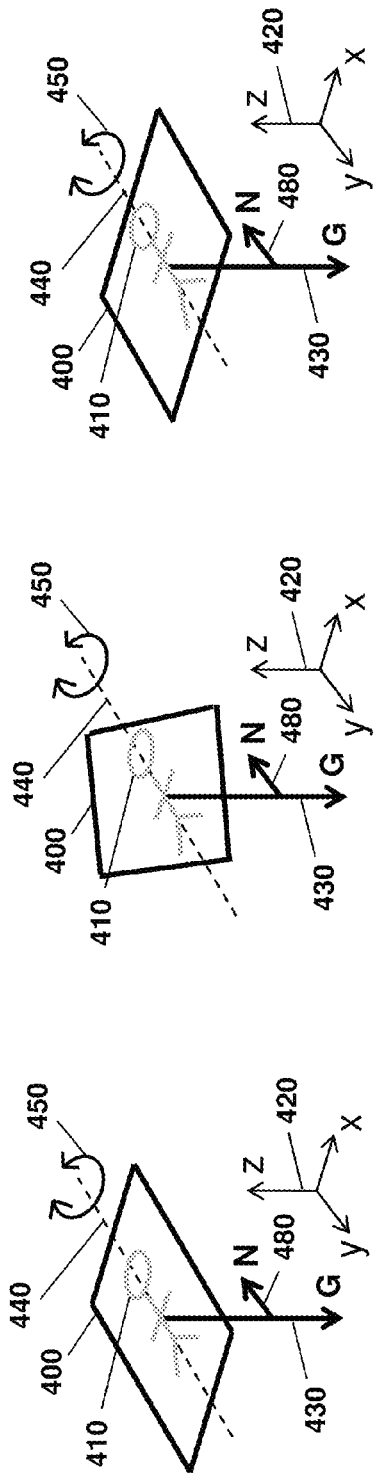
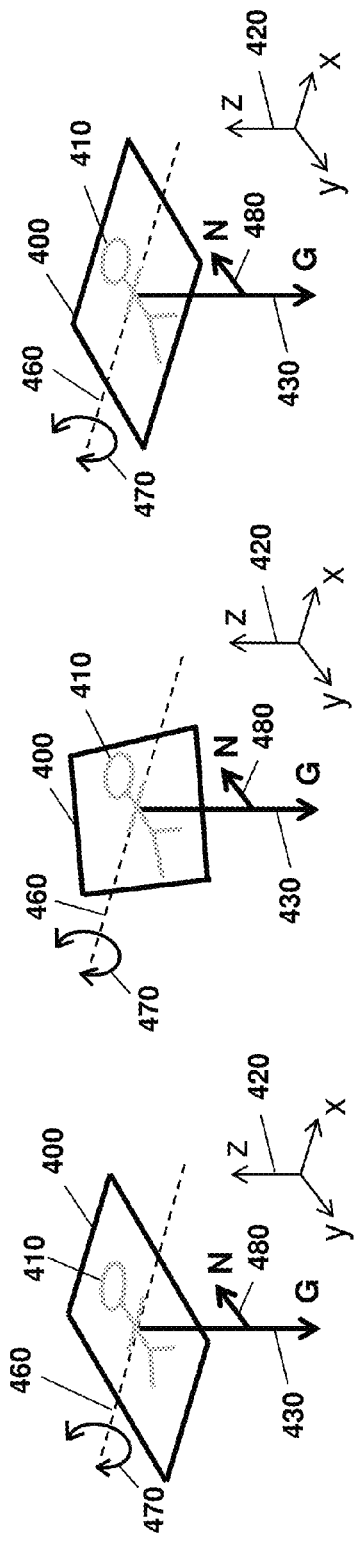
Figure 4

Figure 6
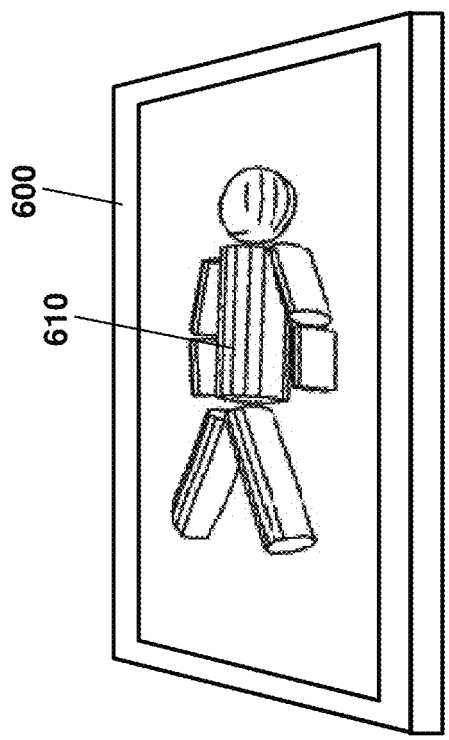
Figure 6A
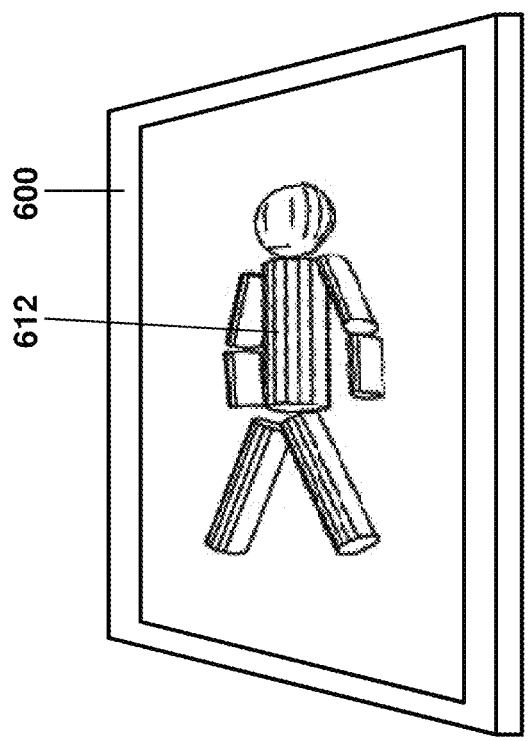
Figure 6B

Figure 7
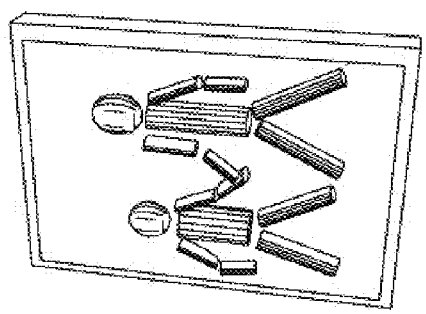
Figure 7A
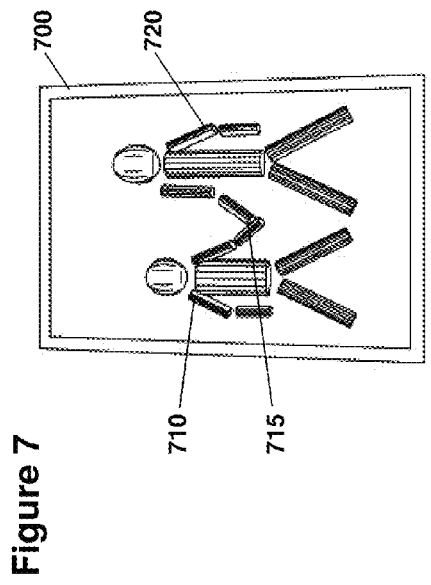
Figure 7B
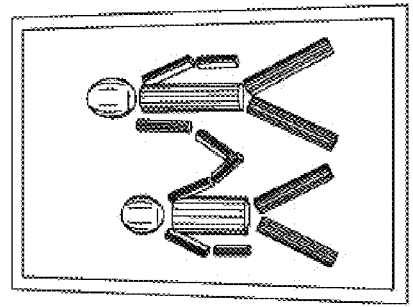
Figure 7C
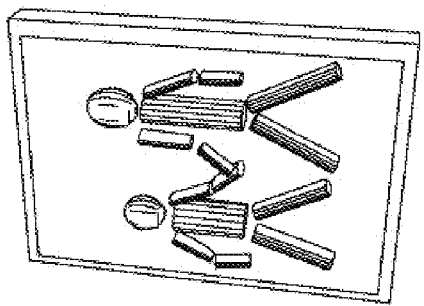
Figure 7D
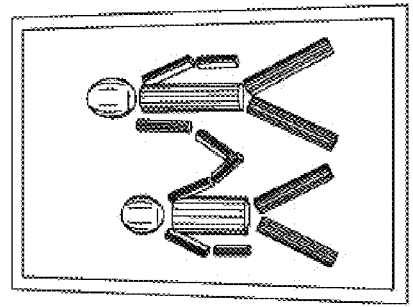
Figure 7E

Figure 8
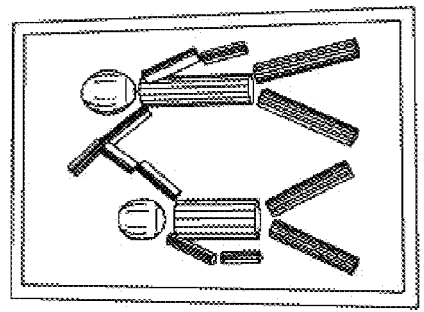
Figure 8D
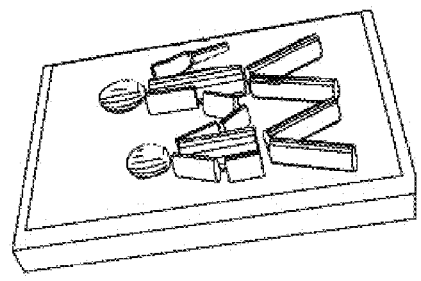
Figure 8B
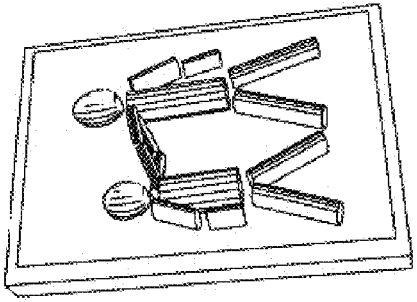
Figure 8C
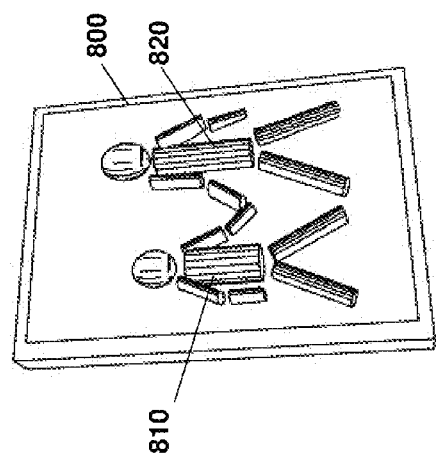
Figure 8A

VIEWPOINT CHANGE ON A DISPLAY DEVICE BASED ON MOVEMENT OF THE DEVICE

CROSS-REFERENCE TO RELATED APPLICATIONS

This is a continuation of U.S. patent application Ser. No. 12/819,250, filed Jun. 21, 2010, issued as U.S. Pat. No. 8,730,267.

FIELD OF THE DISCLOSED TECHNOLOGY

The disclosed technology relates generally to viewing on a display device and, more specifically, to changing a viewing angle based on physical orientation of the device.

BACKGROUND OF THE DISCLOSED TECHNOLOGY

Shopping online is typically a glorified version of catalog shopping. On a catalog page, a picture of the item, or perhaps several pictures, are shown, and, in the case of clothing, typically on a model. One can see the sizes and prices available as well. In an online catalog, generally the same information is available, but in some cases, a person can choose a certain picture and zoom in. In some instances, videos are available. Someone wishing to learn a karate sequence, might watch a video of it, see diagrams, and so forth. Still, the content shown is controlled, by and large, by the provider. The interactivity is limited to the familiar rewind, stop, play, and fast-forward features. While such features are useful, still pictures and even videos are a poor substitute for actually being there.

While using a mouse to click and drag around an object to transpose the position of the object or even rotate it, such an interaction has limited translation to the real world and allows a finite direction of change to what is viewed, based on how the mouse is currently mapped in an application. Generally, such movements either transpose the position of an object or camera position on the XY axis, zooms in, or allows a user choose a different picture where one can repeat the changes.

What is needed is a way to make the user experience more real in such a way as to make a user feel more immersed and in control of what s/he is watching and to have the ability to control greater axes of movement in a natural manner.

SUMMARY OF THE DISCLOSED TECHNOLOGY

It is an object of the disclosed technology to provide a simple and natural interface and control for viewing a human figure.

It is a further object of the disclosed technology to provide a handheld display device whereby a display becomes interactive when the device is moved.

It is a further object of the disclosed technology to take into account orientation and/or acceleration of a device to determine what is displayed on a device.

An embodiment of the disclosed technology is a display device with an orientation sensor. The orientation sensor, which for example could be an accelerometer or a compass, measures orientation of the display device relative to a fixed external directional vector and, in some embodiments, the rate of displacement of the device from the same directional vector. An accelerometer measures orientation or movement changes relative to gravity while a compass measures change in orientation or movement relative to a pole (e.g., relative to the north pole). Thus, depending on orientation of the device and direction of movement, the accelerometer, compass, or combination thereof determines a direction of movement of a display screen. The display device of this embodiment further has a storage device with data representative of a human figure, and a display exhibiting the human figure. The display of the human figure changes based on a direction of movement detected by the orientation sensor, and in some cases, also based on a direction of movement detected by a secondary orientation sensor.

The changing of the exhibited display may be a change in viewpoint of the human figure around a predefined center of gravity of the human figure, or a center of gravity of a plurality of human figures. The center of gravity may be an actual center of gravity, an estimated center of gravity, and/or a chosen point which is at the center, or a approximately a center, as defined in each case in a specific embodiment of the disclosed technology.

The display device may exhibit a display of a moving human figure, the human figure moving irrespective of, and in addition to, a change in viewpoint of the exhibited human figure. That is, a user of the display device may change the orientation of the device relative to his or her position, and the viewpoint of the human figure shown therein may continue to change with changes in device orientation around a vector orthogonal or partionally orthogonal to the sensor's directional vector. The change in viewpoint may be non-linearly or linearly mapped to an amount of movement of the display device.

In a specific embodiment of the display device, upon a first rotation of the device at a first relative position, a first display of the human figure is exhibited. Upon a second rotation to a second relative position, a second display of the human figure is exhibited, such as frames in a continuous video. Upon a third rotation back to the first relative position, a third display of the human figure is exhibited. Thus, for example, a person with frontal face showing may be frowning in the first display at a first relative position of the device. When a user changes the position of the device relative to his or her position, the display of the human figure on the device is changed, such as, for example, to a view of the side of the same person's head. When returning to the first relative position showing the frontal view of the person's face again, the same person is smiling. This viewpoint change may be toggled during repeated successions of viewing and changing the view away from and back to the first relative position.

The human figure shown on the display device may be wearing clothes as part of an offer for sale of the clothes. As another usage, the display may be used to teach a user positioning during an exercise with defined positions, such as yoga, martial arts, sports, and pornography positions.

A further embodiment of the disclosed technology is a method of displaying a series of images on a handheld device. The method proceeds by storing a plurality of images representative of a human figure, measuring the orientation of the handheld device with an orientation sensor, exhibiting on the display a first image of the human figure, and changing the image exhibited based on a direction and rate of movement of the handheld device, as determined from the orientation sensor. The direction and rate of movement are determined by measuring changes in orientation over time compared to a fixed directional vector, such as acceleration due to gravity or magnetic north.

Further elements of the device of the disclosed technology are applicable to embodiments of the method of the disclosed technology.

BRIEF DESCRIPTION OF THE DRAWINGS

FIG. 1 shows an example of a display shown on a display device which changes based on an orientation change of the device.

FIG. 1A shows a first orientation of an example of a display device with images shown on the display that change based on an orientation change of the device relative to a stationary external environment.

FIG. 1B shows the display device at a second orientation, rotated to the left compared to the first orientation.

FIG. 1C shows the display device at a third orientation, rotated further to the left compared to the first and second orientations.

FIG. 2 demonstrates the use of an accelerometer to determine an orientation change in an embodiment of the disclosed technology.

FIG. 2A shows a familiar "portrait" configuration of an image to be reoriented on a display device.

FIG. 2B demonstrates the use of an accelerometer to change an orientation of the image of FIG. 2A relative to a three-dimensional plane, aligned parallel to the ground along one potential orthogonal axis relative to the accelerometer's gravitational orientation directional vector in an embodiment of the disclosed technology.

FIG. 2C shows a rotation around the top and bottom of the displayed person (of FIG. 2A) along the horizontal axis of the display device aligned with the external axis that is orthogonal to the orientation directional vector.

FIG. 2D shows an alternative rotation of the image along the vertical axis of the device.

FIG. 2E shows an alternative rotation of the image along the horizontal axis of the device.

FIG. 3 demonstrates the use of a compass to determine an orientation change in an embodiment of the disclosed technology.

FIG. 3A shows the familiar "portrait" configuration for illustrative purposes.

FIG. 3B demonstrates the use of a compass to determine an orientation change of the image of FIG. 3A displayed on a display device aligned parallel to the x-z plane of the three-dimensional external environment shown by the axes.

FIG. 4 demonstrates the use of an accelerometer and a compass to determine an orientation change in an embodiment of the disclosed technology.

FIG. 4A shows the display device and an image of a person rotating around the vertical axis at a first angle, orthogonal to the accelerometer's gravitational orientation directional vector with the image aligned to the compass's orientation directional vector.

FIG. 4B demonstrates the use of an accelerometer and a compass to change an orientation of the image of FIG. 4A.

FIG. 4C shows the display device and an image of a person rotating around the same axis at a second angle, orthogonal to the accelerometer's gravitational orientation directional vector with the image aligned to the compass's orientation directional vector.

FIG. 4D shows the display device and an image of a person rotating around the horizontal axis at a first angle, orthogonal to the accelerometer's gravitational orientation directional vector with the image aligned to the compass's orientation directional vector.

FIG. 4E demonstrates the use of an accelerometer and a compass to change an orientation of the image of FIG. 4D.

FIG. 4F shows the display device and an image of a person rotating around the same axis at a second angle, orthogonal to the accelerometer's gravitational orientation directional vector with the image aligned to the compass's orientation directional vector.

FIG. 5A shows a first position of a sequence of orientations of an example of changing the position of a human figure in embodiments of the disclosed technology.

FIG. 5B shows a second position of a sequence of orientations of an example of changing the position of a human figure in embodiments of the disclosed technology.

FIG. 5C shows a third position of a sequence of orientations of an example of changing the position of a human figure in embodiments of the disclosed technology.

FIG. 6 shows an example of a display device tilted upwards and downwards with respect to the viewer in an embodiment of the disclosed technology.

FIG. 6A shows an example of a display device at a first position with respect to the viewer in an embodiment of the disclosed technology.

FIG. 6B shows an example of a display device before at a second position, tilted upwards with respect to the viewer in an embodiment of the disclosed technology.

FIG. 7 shows an example of changing orientation of a display with two human figures in an embodiment of the disclosed technology.

FIG. 7A shows a first portrait position in an example of changing orientation of a display with two human figures in an embodiment of the disclosed technology.

FIG. 7B shows a second position in an example of changing orientation of a display with two human figures in an embodiment of the disclosed technology.

FIG. 7C shows the image of FIG. 7A in a third position.

FIG. 7D shows the image of FIG. 7A in a fourth position.

FIG. 7E shows the image of FIG. 7A in a fifth position.

FIG. 8 shows an example of a changing orientation of a display device, as well the changing position of the human figures exhibited on the display device in embodiments of the disclosed technology.

FIG. 8A shows a first position in an example of a changing orientation of a display device, as well the changing position of the human figures exhibited on the display device in embodiments of the disclosed technology.

FIG. 8B shows the image of the human figures of FIG. 8A in a second position.

FIG. 8C shows the image of the human figures of FIG. 8A in a third position.

FIG. 8D shows the image of the human figures of FIG. 8A in a fourth position.

DETAILED DESCRIPTION OF EMBODIMENTS OF THE DISCLOSED TECHNOLOGY

Figure 5:
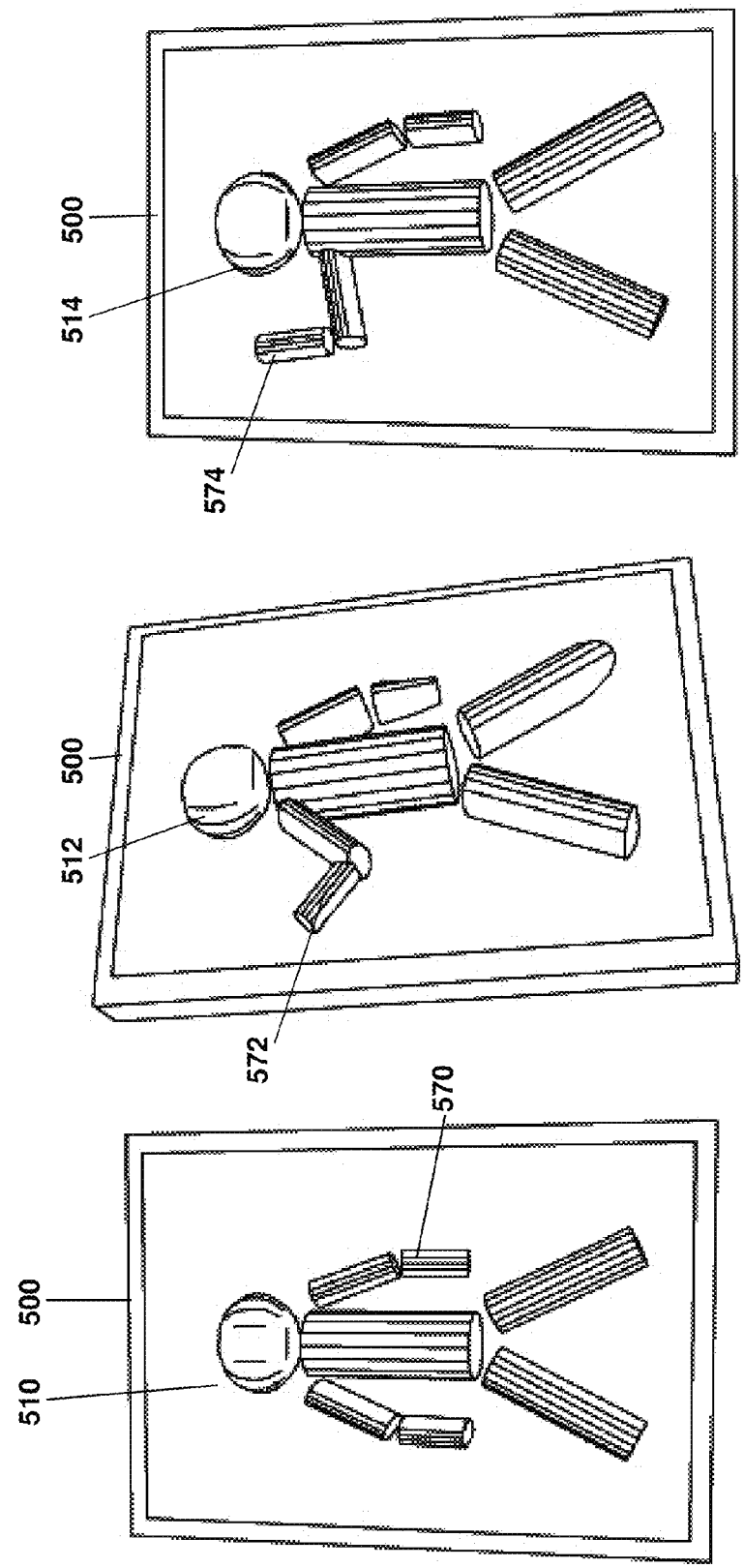
FIG. 5 shows an example of the changing position of a human figure in embodiments of the disclosed technology.

Embodiments of the disclosed technology comprise a handheld display device with a built-in orientation sensor such as an accelerometer or a compass. The display of a human figure on the display screen changes based on a change in the device's hardware with respect to an external orientation vector and the user's viewing angle. That is, upon detecting a change in the viewpoint (e.g., viewing angle, tilt, roll, or pitch of the device relative to the stationary user), the image of the person changes. This may be used with images of a non-moving person, such as for the sale of clothing, or in conjunction with images of a person moving, such as for a sports or exercise instructional video.

For purposes of this disclosure, an accelerometer is defined as a device which measures acceleration of a device relative to freefall. A single or multi-axis accelerometer may be used to carry out embodiments of the disclosed technology to sense orientation. An accelerometer measures the acceleration relative to a frame of reference. An accelerometer at rest relative to the earth's surface will indicate approximately 1 g upwards, because any point on the earth's surface is accelerating upwards relative to a local inertial frame. To obtain the acceleration due to motion with respect to the earth, the offset from gravity is subtracted, or the change in acceleration is measured to determine when an object is rotating about an axis. The combined measurements in relation to multiple axes are used to determine rotation which is unaligned with the earth.

A compass, for purposes of this disclosure, is a device which determines the orientation of the display device of embodiments of the disclosed technology with respect to the plane of the earth's surface. It may detect true north, magnetic north, or any other direction. It may instead determine only a change in direction without knowing an actual direction, in embodiments of the disclosed technology. When determining a magnetic field, this may be by measuring the magnetic field directly or measuring another value and approximating the magnetic field/direction. A solid state compass, global positioning system, or other such device may be used for this purpose.

The display device used in embodiments of the disclosed technology is a display capable of changing an exhibited image and is a screen in two dimensions (e.g., a flat screen, CRT screen, LCD screen, plasma screen, etc).

Embodiments of the disclosed technology will become clearer in view of the description of the following figures.

FIG. 1 shows an example of a display device with images shown on the display that change based on an orientation change of the device relative to a stationary external environment. FIG. 1A shows the display device at a first orientation. FIG. 1B shows the display device at a second orientation, rotated to the left compared to the first orientation. FIG. 1C shows the display device at a third orientation, rotated further to the left compared to the first and second orientations. In this example, as the display device is turned to the left, a clockwise rotation around a vertical axis, the image shown on the display changes and the person in the image appears to rotate to the left. FIG. 1A shows the initial image of the person 110 on the display device 100, such as when selecting a person to view. Such a selection might be made upon decision to view a clothing item for possible purchase, or the like, as will be discussed below. The initial position of the display device is within an environment having an orientation relative to the external environment 120 where the x and y axes are parallel to the plane of the page on which the figure is printed, with the z axis pointing out towards the viewer. The orientation directional vector 130 is shown pointing into the plane of the paper and away from the viewer, and could represent, for example, either acceleration due to gravity or a magnetic field direction such as magnetic north. As the display device 100 is rotated to the left, the orientation of the device changes with respect to the viewer and the external environment. The image of the person presented on the display rotates to the left, along with the direction of rotation of the display device, in a second and third position of the person 112 and 114 and second and third orientation of the device relative to the external environment 120. In this example, the object on the display reacts just as a real object such as a doll would appear if held in the viewer's hands and rotated similarly, providing images that simulate the real-world rotation.

In embodiments of the disclosed technology, this is a linear or non-linear relationship. In a linear relationship, the rotation may be made to feel natural, that is, a person is looking around the object by tilting the screen. As the screen is tilted, so too is the image in an adjacent manner, whether it is rotated the same degree amount or a multiple of that amount. That is, by way of example, when the screen is rotated 30, 45, and 60 degrees, the person shown in the image is rotated 30, 45, and 60 degrees in a one-to-one linear correspondence, or 60, 90, and 120 degrees in a two-to-one linear correspondence, or −30, −45, and −60 in a negative one correspondence. In a non-linear example, when rotating the device/screen 30, 45, and 60 degrees, the person shown may be rotated 30, 90, and 180 degrees, respectively.

FIGS. 2 and 3 demonstrate the relationship of the display device to orientation directional vectors in embodiments of the disclosed technology. FIG. 2 demonstrates the use of an accelerometer to determine an orientation change in an embodiment of the disclosed technology. FIG. 3 demonstrates the use of a compass to determine an orientation change in an embodiment of the disclosed technology.

Referring first to FIG. 2A, the display device 200 (where possible, elements shown in FIG. 1 have been incremented by 100 in FIG. 2) displays an image of a person 210 on its display screen in the embodiment shown. Although the display screen of the device could actually have any dimension, FIG. 2A shows the familiar "portrait" configuration for illustrative purposes. The person image 210, in this example, is aligned and in a fixed position with respect to the top and bottom of the device. FIGS. 2B and 2C show the display device in an orientation relative to a three-dimensional plane 220, aligned parallel to the ground along one potential orthogonal axis 240 relative to the accelerometer's gravitational orientation directional vector, G, 230, in an example of a change in orientation of the display shown in FIG. 2A. The circular arrow 250 in FIGS. 2B and 2C shows the directions of user rotation around the center of the display device that is detected with an accelerometer in embodiments of the disclosed technology and used as a signal for choosing and changing images displayed on the device. The rotation along the vertical axis of the display device aligned with the external orthogonal axis shown in FIG. 2B represents changing the view around the right and left sides of the person, similar to the process shown and described with reference to FIG. 1.

FIG. 2C shows a rotation around the top and bottom of the displayed person (of FIG. 2A) along the horizontal axis of the display device aligned with the external axis that is orthogonal to the orientation directional vector. FIGS. 2D and 2E show the device with the same image alignment of FIG. 2A at a second orthogonal angular variation 260 and rotation directions 270. Again, FIG. 2D shows the rotation along the vertical axis of the device, while FIG. 2E shows the rotation along the horizontal axis of the device. Note that the axes of the display device 200 could actually be aligned along any axis orthogonal or partially orthogonal to the orientation directional vector, G, 230, and that the axis at angle 240 shown in FIGS. 2B and 2C, and the axis at angle 260 shown in FIGS. 2D and 2E are chosen simply for illustrative purposes. Also, the device may be rotated, in embodiments of the disclosed technology, around any axis orthogonal to the orientation directional vector G passing through the plane of the device, not just vertical (FIGS. 2B, 2D) or horizontal (FIGS.

2C, 2E), as long as the accelerometer can determine the angle of rotation. So long as image data is provided for such changes in orientation, a view in any direction around the person (or other object shown in the video display) is shown from any viewing direction by changing the device's orientation with respect to the orientation directional vector, G, 230 in the embodiment shown.

The rotations depicted by arrows 250 and 270 described above with reference to FIG. 2 are generally measurable with an accelerometer. The measured directional change of a point on the display device with respect to the gravity of the earth (e.g., acceleration of the display device relative to freefall) is determined, and, based on this determination, the image shown (e.g., person image 210) on the display device is changed accordingly. In such orientation changes as shown in FIG. 2, an accelerometer may be used without the aid of a compass or determination of an orientation relative to the surface of the earth.

FIG. 3 demonstrates the use of a compass to determine an orientation change in an embodiment of the disclosed technology. The elements of FIG. 3 are generally incremented by 100 compared to those of FIG. 2. FIG. 3 shows the orientation directional vector 330 obtained from a compass being used to generate the device orientation information that drives the image changing mechanism of the embodiment shown. Unlike an accelerometer, the compass is aligned only along the magnetic field lines of the earth with no relationship to mass and freefall, so only rotations 350 around the vertical axis are used for orientation determination with a compass. FIG. 3A shows a video display of an image of a person 310 on the screen of the display device 300 in the embodiment shown. The person image is aligned and in a fixed position with respect to the top and bottom of the device for simplifying the understanding of embodiments of the disclosed technology. Although the display screen of the device could actually have any dimension, FIG. 3A shows the familiar "portrait" configuration for illustrative purposes. FIG. 3B shows the image of FIG. 3A displayed on a display device aligned parallel to the x-z plane of the three-dimensional external environment shown by the axes 320. When the display device turns with respect to a pole or cardinal direction, a compass or other magnetic field or directional indicator mechanism detects or measures this change (in terms of a relative change with respect to the original direction or more absolute change with respect to the earth's magnetic fields). Rotations of the display device around the vertical axis or comprising a vertical component to rotation about axis 340 orthogonal to the orientation directional vector generate angle displacements that can be used to change the images of the person (or other object displayed). Similar to the images shown in FIG. 1, rotations 350 of the device 300 in either direction gives the impression of looking around the person's figure. Unlike with an accelerometer, there is no measurable change for rotations around the horizontal (parallel to the x-axis) or other non-vertical axes passing through the screen of the device.

Using a combination of the methods and devices described with regard to FIGS. 2 and 3 and in the disclosure above, a change in orientation of the display device is detected, in embodiments of the disclosed technology, in any direction. These directional changes, which may be detected in embodiments of the disclosed technology, include rotations about any one of a combination of the X, Y, and Z axes (which may be defined, in this instance, as in any direction in which a change to orientation with respect to any of the X, Y, and Z axes is detectable) regardless of the starting orientation of the display device.

FIG. 4 demonstrates the use of an accelerometer and a compass to determine an orientation change in an embodiment of the disclosed technology. FIG. 4 shows an embodiment that employs the accelerometer in conjunction with a compass, in order to obtain two orientation directional vectors which can be used to fix the orientation of the person object in three-dimensional space so that the device can be used to explore the person as an object. The elements of FIG. 4 are generally incremented by 100 compared to those of FIG. 3. Similar to FIGS. 2B and 2C, FIGS. 4A and 4C show the display device 400 and an image of a person 410 rotating around the same axis at angle 440, orthogonal to the accelerometer's gravitational orientation directional vector 430. But unlike in FIGS. 2A and 2B, the person image in FIGS. 4A and 4C is not aligned to the top of the display device, but rather aligned to the compass's orientation directional vector 480. Thus, upon rotation of the device around the vertical z-axis in the external environment 420, the image object appears to remain stationary in three-dimensional space. Note that although the position of the person object is stationary, the view direction of the person object, or the image of the person, still changes with the orientation of the device in the external environment. FIG. 4B shows a third intermediate position between FIGS. 4A and 4C as the display device rotates counterclockwise around the z-axis, with the person object aligned to the magnetic orientation directional vector 480. Rotations 450 around the axis at angle 440 orthogonal to the accelerometer orientation directional vector 430 still use the accelerometer-measured displacements to allow the viewer to observe the person image from the sides as described in FIG. 1 and FIGS. 2B and 2D. FIGS. 4D, 4E, and 4F show the same rotational concept as in FIG. 2E, wherein a rotation 470 of the device along a second independent orthogonal axis 460 would allow the viewer to look above and below the person object. Again, the information obtained from the compass keeps the person (or other) image aligned to the magnetic orientation directional vector 480. The display device could be rotated around any orthogonal axis such as 440 or 460 to obtain different directional views (images) of the person object. Note that when the display device moves to a vertical position, where the vertical axis of the display device is aligned to the z-axis of the external environment, there is no measurable accelerometer data and the system defaults to a purely compass orientation directional vector-based system as described in FIG. 3.

FIG. 5 shows an example of changing the position of a human figure in embodiments of the disclosed technology. FIGS. 5A through 5C show a sequence of orientations and displays on a display device 500. The figure may change position over time, irrespective of the orientation of the device, or may change position as a result of a change in orientation of the display device. A combination of these cases may also be employed where the person image changes over time in a specific device orientation, and the display orientation of the human figure also changes as a result of a change in orientation of the display device. Each of these cases will be described in more detail below.

Referring now to the first case described above, that is, a changing human figure over time, irrespective of the orientation of the device, this may be a series of sequential images or a video. In the example shown, the human figure's arm is in a down position 570 at a first time, shown in FIG. 5A, being raised 572 at a second time, in FIG. 5B, and pointing upwards 574 at a third time, shown in FIG. 5C. As can be seen in FIGS. 5A, 5B, and 5C, the orientation of the device changes from a first orientation in FIG. 5A to a second orientation in FIG. 5B, and back to the first orientation in FIG. 5C. However, the human FIGS. 510 and 514, while in the same orientation (because the display devices are in the same orientation) are in different positions because a certain amount of time has elapsed, and over that period of time, the human FIG. 510/512/514 has moved. This may be used for example with showing a football or other sports move. Here, the human figure is throwing a football and, to learn proper technique while watching the video/succession of images, a viewer can change the orientation of the device to see different angles of the human figure to learn how to emulate the move. Likewise, it may be a dance move, part of a pornographic video, or an advertisement such as for the sale of clothing.

In the second case described above, the change in position of the human figure may be as a result of a change in orientation of the display device. In FIG. 5A, in a first orientation and a first image being displayed on the display device, the arm is down 570. When rotating/tilting the display device, as shown in FIG. 5B, a second orientation and a second position of the human figure are shown (here, with a raised arm 572). When returning to the first orientation, in FIG. 5C, the arm is now raised. In this manner, any feature of the human figure may be changed, such as a smile to a frown, an arm up to an arm down, indicia on clothing, and the like. Each time a person cycles through from the orientation in FIG. 5A to FIG. 5B and back to the first orientation in FIG. 5C, the human figure may be toggled. That is, for example, the change from the orientation in 5A to 5B and back to the original orientation and human FIG. 514 is shown. Do it again, and the human FIG. 510 is shown.

In a combination of the two cases described above, the video or images could be continuously changing as time progresses, but the set of video images shown at every particular orientation of the device would be relative to each particular orientation. For example, in FIG. 5A, the first orientation, the person 510 might be speaking for one minute. If left in that orientation, the speaker would conduct his speech with his arm down 570 for the entirety of the speech. However, if during that one minute, the user instead changes the device to a second orientation as shown in FIG. 2B, he may raise his hand 572 during the course of the one minute speech. Upon returning back to the first orientation, shown in FIG. 5C, his hand 574 is now raised until the one minute speech is complete. In this way, the movement to the second position shown in FIG. 5B actually altered the progression of the video. Alternatively, upon returning back to the first orientation from the second orientation of FIG. 5B the speaker could have instead resumed his original hand position 570 of FIG. 5A, instead of maintaining the change of hand position 572, 574 shown in FIG. 5B and FIG. 5C.

FIG. 6 shows an example of a display device tilted upwards and downwards with respect to the viewer in an embodiment of the disclosed technology. The display device 600 is turned 90 degrees clockwise with respect to that of the display device shown in FIG. 2, but the tilt is analogous to the directional change indicated by arrow 270 in FIG. 2E.

FIG. 7 shows an example of the changing orientation of a display with two human figures in an embodiment of the disclosed technology. On a display 700, both human FIGS. 710 and 720 are exhibited. As the orientation changes (left/right as cycled through the FIGS. 7A, 7B, 7C, 7D, and 7E), the human FIGS. 710 and 720 are rotated, that is, the perspective from which they are viewed is rotated from the point of view of the viewer. Here, they are rotated about a center of gravity 715 which is a combined center of gravity of the figures shown, e.g., roughly at the point of contact of their hands. Any of the techniques and embodiments shown and described with reference to FIGS. 1 through 6 may be employed with the two or more human FIGS. 710 and 720 shown in FIG. 7.

FIG. 8 shows an example of the changing orientation of a display device as well the changing position of the human figures exhibited on the display device in embodiments of the disclosed technology. That which is shown in FIGS. 8A through 8D is analogous to a combination of what has been shown and described with respect to FIGS. 5 (change in position of human figure) and 7 (using multiple human figures). In this manner, whether based on time or orientation change or both, the orientation of the human FIGS. 810 and 820 and position of the human figures on device 800 are changed. It should be understood that any element of the displayed human figures may change, including their position, position of one figure relative to the other, color of clothing or indicia, addition or removal of a logo, change in facial expression, addition of props (e.g., a football), and the like.

Figure 9:
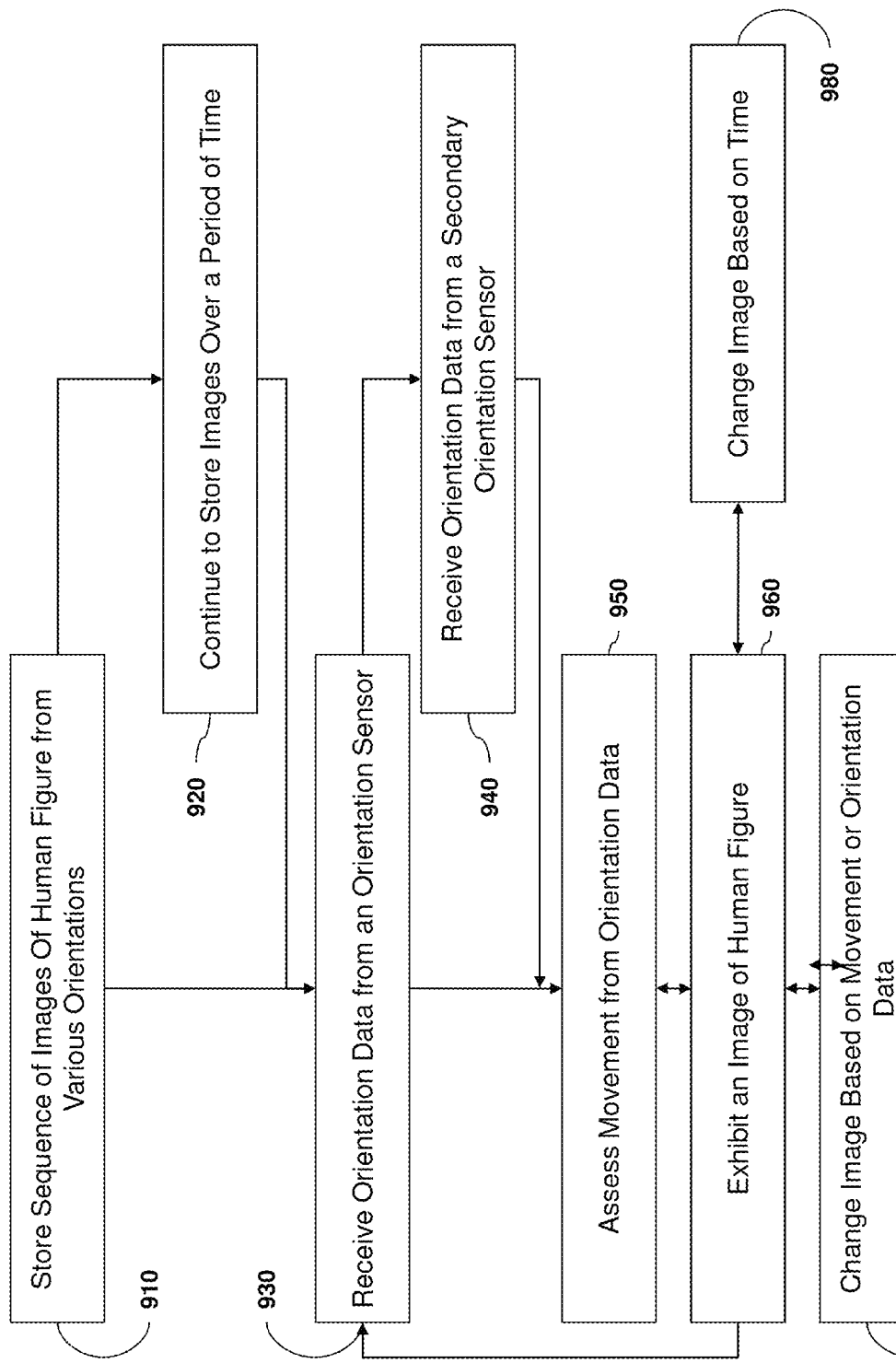
FIG. 9 shows steps taking in a method of carrying out embodiments of the disclosed technology.

FIG. 9 shows steps taken in a method of carrying out embodiments of the disclosed technology. In step 910, a sequence of images of a human figure is stored in various orientations. This is at a first moment or instant in time. Thus, for example, in an application where the image will change based on a clockwise-counterclockwise rotation (see, for example, FIG. 5), images may be stored around the left and right side of the person. In optional step 920, images are stored over a period of time. These images may be from one or multiple orientations, the human figure may be moving or changing in some manner (e.g., clothes changing color or styles to show different clothing options for sale), and may be a video. It is known, for example, in movies to have moveable or multiple cameras around a person conducting an action, so that the camera view can appear to swoop around the person at a moment in time or during a scene, but embodiments of the present technology allow the viewer to actually change the viewing angle at the time of viewing. Thus, the experience becomes interactive with natural movement or changes of orientation of the viewer and/or handheld device.

In step 930, which can be carried out before, after, or both before and after step 960, orientation data is received in a continuous manner from an orientation sensor, such as an accelerometer or a compass or another instrument for measuring orientation of, or relative to, a pre-existing magnetic field. From this data, in step 950, it is determined how the display device of embodiments of the disclosed technology is moving or being reoriented, whether tilting up/down, tilting left/right, being rotated left/right, or being reoriented towards a different cardinal direction. To supplement this, in embodiments of the disclosed technology, in step 940, orientation data is further received from a secondary orientation sensor, which could also be an accelerometer or compass. Then, in step 960, an image of a human figure is exhibited which is either a pre-defined first image or an image based on the orientation or position of the display device. Steps 930 and 940 continue to be carried out, and in step 970, upon receiving further movement data from the accelerometer (such as movement past a predefined threshold) or new orientation data from a compass, the image is changed. The image may additionally change over time, such as with a video or sequence, in step 980. A change in time and a change in orientation would produce a combined change, in embodiments of the disclosed technology. Thus, over time, the human figure moves irrespective of a change in viewpoint (orientation) of the exhibited human figure. A change in viewpoint may also occur, as determined by received motion data providing movement data with regard to the display device.

Figure 10:
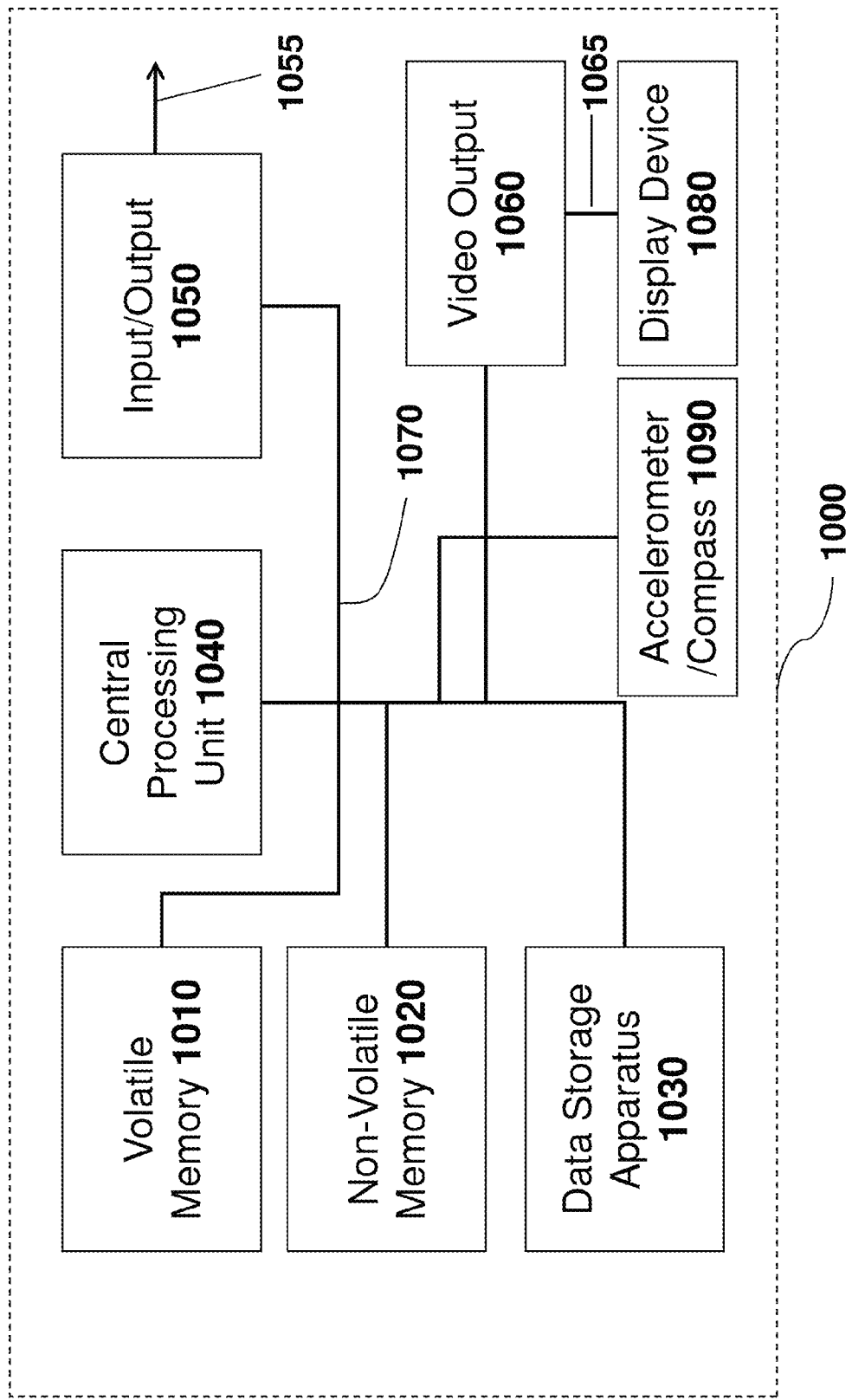
FIG. 10 shows a high level block diagram of a specialized image input and display device on which embodiments of the disclosed technology may be carried out.

FIG. 10 shows a high level block diagram of a specialized image input and display device on which embodiments of the disclosed technology may be carried out. The device may comprise some or all of the high level elements shown in FIG. 10 and may comprise further devices or be part of a larger device. Data bus 1070 transports data between the numbered elements shown in device 1000. Central processing unit 1040 receives and processes instructions such as code. Volatile memory 1010 and non-volatile memory 1020 store data for processing by the central processing unit 1040.

The data storage apparatus 1030 may be magnetic media (e.g., hard disk, video cassette), optical media (e.g., Blu-Ray or DVD) or another type of storage mechanism known in the art. The data storage apparatus 1030 or the non-volatile memory 1020 stores data which is sent via bus 1070 to the video output 1060.

A datum received from an accelerometer or compass 1090 is processed by the central processing unit 1040 to determine if a change in viewpoint or orientation has been made. The displayed image, as described above, is outputted via a video output 1060, that is, a transmitter or video relay device which transmits video to a television screen, monitor, or other display device 1080 via cable or data bus 1065. The video output 1060 may also be an output over a packet-switched network 1065 such as the internet, where it is received and interpreted as video data by a recipient display 1080. The recipient display may be a liquid crystal display, cathode ray tube, or series of light-emitting diodes, or any other known display system.

An input/output device 1050, such as buttons on the device itself, an infrared signal receiver for use with a remote control, or a network input/output for control via a local or wide area network, receives and/or sends a signal via data pathway 1055 (e.g., infrared signal, signal over copper or fiber cable, wireless network, etc. The input/output device, in embodiments of the disclosed technology, receives input from a user, such as which image to display and how to interact with a detected object.

Figure 11:
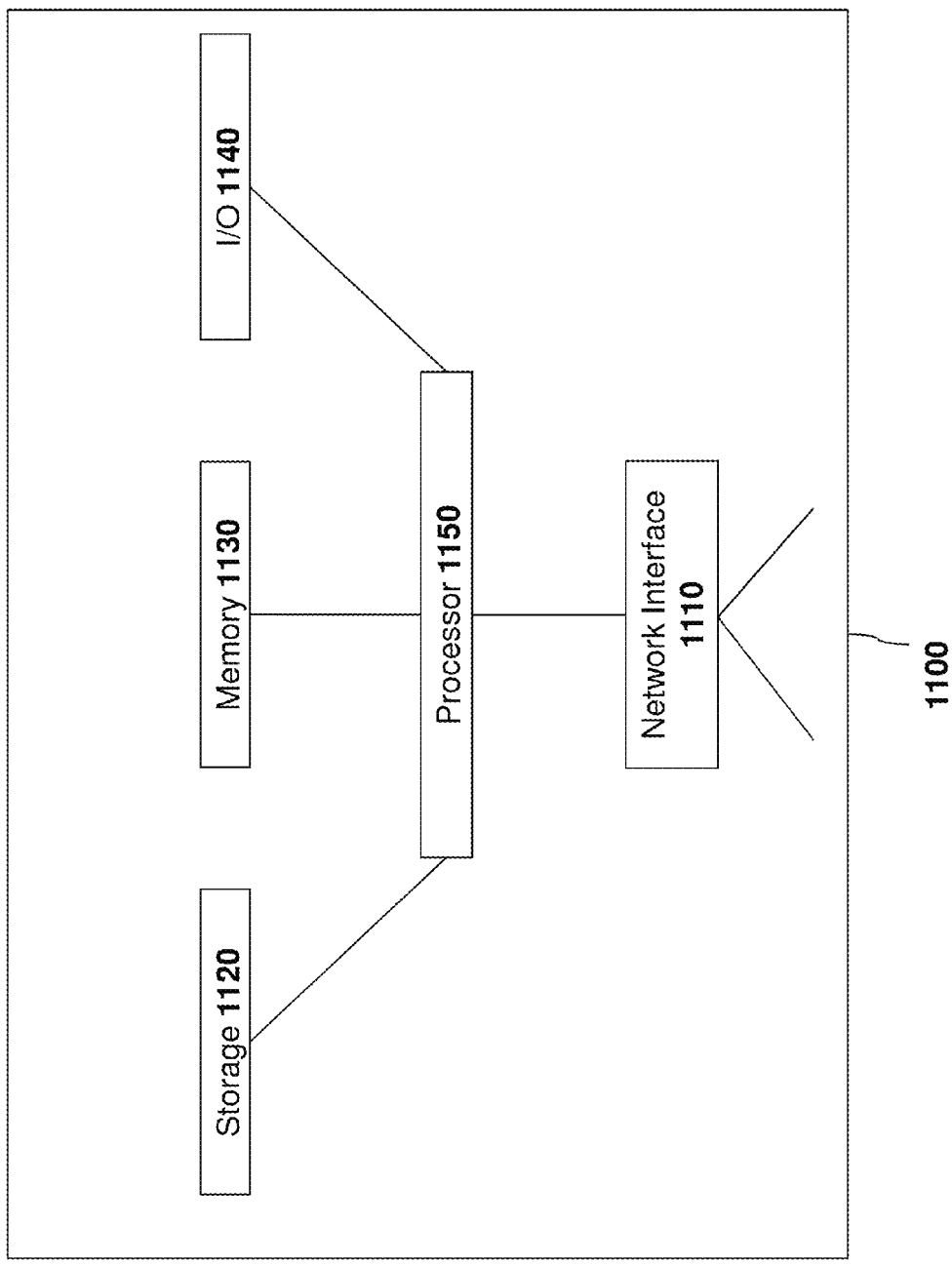
FIG. 11 shows a high-level block diagram of a computer that may be used to carry out the disclosed technology.

FIG. 11 shows a high-level block diagram of a computer that may be used to carry out the disclosed technology. Computer 1100 contains a processor 1150 that controls the overall operation of the computer by executing computer program instructions which define such operation. The computer program instructions may be stored in a storage device 1120 (e.g., magnetic disk, database) and loaded into memory 1130 when execution of the computer program instructions is desired. Thus, the computer operation will be defined by computer program instructions stored in memory 1130 and/or storage 1120, and the computer will be controlled by processor 1150 executing the computer program instructions. Computer 1100 also includes one, or a plurality of, input network interfaces for communicating with other devices via a network (e.g., the internet). Computer 1100 also includes one or more output network interfaces 1110 for communicating with other devices. Computer 1100 also includes input/output 1140, representing devices which allow for user interaction with the computer 1100 (e.g., display, keyboard, mouse, speakers, buttons, touch-sensitive screen, etc.).

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the disclosed technology.

I claim:

1. A display device comprising:
   an orientation sensor measuring rotation of said display device;
   a storage device comprising image data to be exhibited on said display device, said image data being representative of an object;
   a display exhibiting said image data representative of said object, wherein said image data representative of said object rotates independently to an axis orthogonal to said orientation sensor's orientation directional vector generating angle displacements of said device.

2. The display device of claim 1, wherein the orientation sensor is an accelerometer and the said orientation sensor's orientation directional vector is a gravitational orientation directional vector.

3. The display device of claim 1, wherein said change in said image data representative of said object exhibited on a said display comprises a change of viewpoint of said object exhibited on said display around a predefined center of gravity of said object, said predefined center of gravity corresponding to an axis of rotation of said display device.

4. The display device of claim 3, wherein said image data representative of an object is image data representative of a plurality of objects and said predefined center of gravity is a center of gravity of said plurality of objects.

5. The display device of claim 3, wherein said display exhibits image data representative of a moving object, said object moving irrespective of, and in addition to, a change in viewpoint of said exhibited image data of said object.

6. The display device of claim 3, wherein said change in viewpoint is non-linearly mapped to an amount of movement of said display device.

7. The display device of claim 3, wherein said rotating of said display device and said rotating of said image data representative of said object are both either to the left or to the right or where one rotates to left and one rotates to the right.

8. The display device of claim 1, wherein:
   upon a first rotation of said display device to a first relative position, said display exhibits first image data of said object;
   upon a second rotation of said display device in a second relative direction to a second relative position, said display exhibits second image data of said object which is different than said first image data and corresponding to a change in view of said object in said second relative direction; and
   upon a third rotation of said display device back to said first relative position, said display exhibits third image data of said object which is different than said first and said second image data.

9. The display device of claim 8, wherein upon a further rotation of said display device to said second relative position, and back to said first relative position, said display again exhibits said first image data of said object.

10. The display device of claim 1, wherein said image data of said object is used to teach a user of said display device positioning during an exercise with defined positions, wherein first exhibited image data is representative of a first angle of a said defined position and second exhibited image data is representative of a second angle of a said defined position.

11. The display device of claim 1, wherein said display device further comprises a compass and said exhibited image data of said object is further changed based on a change of rotation of said display device as measured by said compass.

12. A method of displaying a series of images on a handheld device comprising:
   storing a plurality of images representative of a object to be exhibited on a display of said handheld device;
   measuring direction of rotation of said handheld device with an orientation sensor;
   exhibiting on said display of said handheld device a first image representative of said object, said first image selected from said plurality of images; and
   changing said image exhibited on said display to at least a second image representative of said object corresponding to a direction of rotation of said handheld device, as detected by said orientation sensor, said second image selected from said plurality of images;
   wherein said image data representative of said object rotates independently to an axis orthogonal to said orientation sensor's orientation directional vector generating angle displacements of said device.

13. The method of claim 12, wherein said orientation sensor is an accelerometer and said orientation sensor's orientation directional vector is a gravitational orientation directional vector.

14. The method of claim 12, wherein said changing said image comprises changing said image exhibited on said display to a said second image which is representative of a change of viewpoint of said exhibited object around a predefined center of gravity of said object.

15. The method of claim 12, wherein at least one of said plurality of images representative of said object is an image representative of a plurality of objects, and said predefined center of gravity is a center of gravity of said plurality of objects.

16. The method of claim 12, wherein said exhibiting comprises exhibiting on said display image data representative of a moving object, said object moving in addition to, and irrespective of, said change in viewpoint of said object represented in said second image.

17. The method of claim 16, wherein said change in viewpoint is non-linearly mapped to an amount of movement of said handheld device.

18. The method of claim 12, wherein said exhibiting comprises:
   upon a first rotation of said handheld device to a first relative position, exhibiting on said display a first image of said object;
   upon a second rotation of said handheld device to a second relative position, exhibiting on said display a second image of said object which is different than said first image; and
   upon a third rotation of said handheld device back to said first relative position, exhibiting on said display a third image of said object which is different than said first and said second images.

19. The method of claim 12, wherein said exhibiting also comprises, upon a further rotation of said handheld device to said second relative rotated position, and back to said first relative position, again exhibiting on said display said first image of said object.

20. The method of claim 12, wherein said exhibiting of said image of said object is initially based on an initial orientation of said handheld device.

* * * * *